United States Patent [19]
Plantan et al.

[11] Patent Number: 5,588,348
[45] Date of Patent: Dec. 31, 1996

[54] BRAKE ACTUATOR WITH CENTERING DOME IN SERVICE CHAMBER

[75] Inventors: Ronald S. Plantan; Henry T. Dangson, both of Charlotte, N.C.

[73] Assignee: Indian Head Industries, Inc., Charlotte, N.C.

[21] Appl. No.: 512,022

[22] Filed: Aug. 7, 1995

[51] Int. Cl.⁶ .............................. F01B 19/00; F01B 31/00
[52] U.S. Cl. .................... 92/63; 92/98 R; 92/130 A
[58] Field of Search ............................. 92/63, 96, 98 R, 92/99, 100, 101, 102

[56] References Cited

U.S. PATENT DOCUMENTS

| | | | |
|---|---|---|---|
| 2,919,590 | 1/1960 | Griswold | 92/100 X |
| 3,182,566 | 5/1965 | Berg et al. | 92/101 X |
| 3,258,029 | 6/1966 | Parrino | 92/99 X |
| 3,424,064 | 1/1969 | Valentine | 92/101 |
| 3,696,711 | 10/1972 | Berg et al. | 92/130 A X |
| 3,712,178 | 1/1973 | Hensley | 92/63 X |
| 3,731,594 | 5/1973 | Rannenberg | 92/99 X |
| 3,768,379 | 10/1973 | Gardner | 92/99 |
| 3,926,094 | 12/1975 | Kurichh et al. | 92/63 |
| 4,031,814 | 6/1977 | Lukens et al. | 92/63 |
| 4,263,840 | 4/1981 | Herrera | 92/63 |
| 4,344,838 | 6/1982 | Fessler et al. | 92/99 X |
| 4,850,263 | 7/1989 | Rumsey et al. | 92/63 |
| 4,860,640 | 8/1989 | Ware | 92/63 |
| 5,002,164 | 3/1991 | Bowyer | 92/63 X |
| 5,345,858 | 9/1994 | Pierce | 92/63 X |
| 5,526,732 | 6/1996 | Stojic | 92/63 |

FOREIGN PATENT DOCUMENTS

| | | | |
|---|---|---|---|
| 936311 | 12/1955 | Germany | 92/96 |
| 429988 | 10/1974 | U.S.S.R. | 92/98 R |

*Primary Examiner*—John E. Ryznic
*Attorney, Agent, or Firm*—Howard & Howard

[57] ABSTRACT

An improved spring brake actuator includes a dome extending into the service chamber from the center housing. The spring chamber push rod is formed with a plate having a cross-section corresponding to the dome. The service chamber diaphragm as well as the service chamber piston are also formed with surfaces that correspond to the shape of the dome. The surfaces "stack up" to ensure alignment between the spring chamber push rod and the service chamber push rod. The use of the dome also provides additional stroke to the spring chamber push rod without requiring additional axial length for the overall brake actuator.

18 Claims, 2 Drawing Sheets

5,588,348

BRAKE ACTUATOR WITH CENTERING DOME IN SERVICE CHAMBER

BACKGROUND OF THE INVENTION

This application relates to an improved spring brake actuator wherein a dome extends into the service chamber from the center housing, and aligns the spring chamber push rod and the service chamber push rod.

Spring brake actuators are known wherein centering devices are provided between the push rod and the power spring. Known brake actuators have typically not included structure to align the push rod in the spring chamber with the push rod in the service chamber. If there is misalignment between the two push rods, then it becomes more difficult for the spring brake actuator to function properly.

Moreover, it is a goal of modem spring brake designers to minimize the required axial length of the spring brake actuator. It is additionally a goal of any design to minimize the amount of material required for the item. To this end, it would be desirable to minimize required axial length of the spring brake actuator design, and to minimize the material required for the housing members of the spring brake actuator. In the past, a dome has often extended from the center housing into the spring chamber. This dome provides guidance over sufficient length such that the spring chamber push rod is guided during movement by the center housing. The prior art dome extending into the spring chamber does not provided any guidance or alignment to the service chamber push rod or diaphragm.

SUMMARY OF THE INVENTION

In a disclosed embodiment of this invention a dome extends from the center housing into the service chamber. The spring chamber push rod extends through this dome and is connected to a plate in the service chamber side of the dome. The plate is configured to correspond to the shape of the dome. A service chamber diaphragm selectively contacts the plate, and is permanently deformed at a central portion to correspond to the shape of the plate, and hence the shape of the dome. The service chamber diaphragm contacts a service chamber piston which is fixed to the service chamber push rod. The service chamber piston also has a configuration that corresponds to the configuration of the diaphragm and the plate. Thus, the service chamber piston, the diaphragm, and the plate all correspond to, and stack on, the dome extending from the center housing into the service chamber. Not only is the spring chamber push rod aligned by this structure, but so is the service chamber push rod.

In a preferred embodiment the cross-section of the dome and corresponding structures decreases from a portion closer to the spring chamber in a direction moving into the service chamber. Most preferably the cross-section is generally frustro-conical.

The alignment structure results in unexpected benefits. The spring chamber push rod extending through the dome in the service chamber is provided with additional space for travel that does not require additional length or material for the center housing. In the past, when a guiding portion of the center housing extended upwardly into the spring chamber, the top of that portion set an uppermost limit for movement of the spring chamber push rod. With the invention, the spring chamber push rod now moves downwardly until the spring chamber diaphragm or piston contacts the upper end of the center housing.

In this way, additional stroke for the spring chamber push rod is achieved while still reducing the required length for the housing. This benefit will be explained more fully below in connection with the drawings.

In further features of this invention, a "bed spring" type spring is used as the return spring in the service chamber. This type of spring has a cross-sectional shape such that its central portion has a smaller radial circumference than its axially outer portions. When collapsed, the axially outer portions fit around the guiding cross section of the service chamber piston. The bed-spring type spring is thus better adapted to be utilized with the inventive structure.

These and other features of the present invention will be best understood from the following specification and drawings, of which the following is a brief description.

DETAILED DESCRIPTION OF A PREFERRED EMBODIMENT

Figure 1:
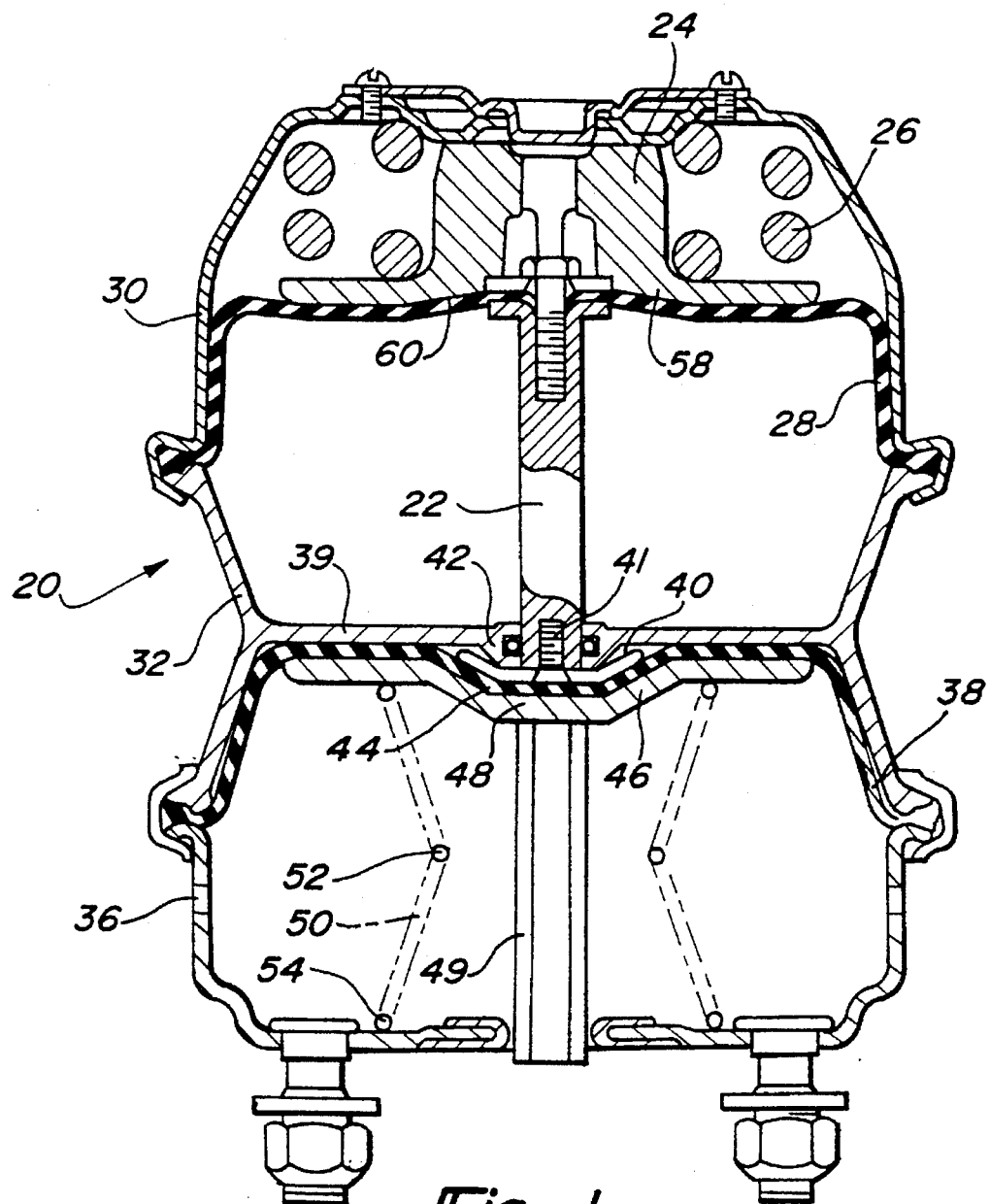
FIG. 1 is a cross-sectional view through an inventive brake actuator incorporating the present invention.

An inventive spring brake actuator 20 is illustrated in FIG. 1. Although the invention is illustrated in combination with a dual diaphragm brake actuator it should be understood that a piston could be utilized in the spring chamber of the brake actuator 20. As known, push rod 22 is received within the spring chamber. A spring piston 24 receives power spring 26. A diaphragm 28 is secured between an outer housing 30, and a center housing 32. A service chamber housing 36 is fixed to center housing 32, with diaphragm 38 secured between the housings 36 and 32.

A plate 40 is connected by a bolt 41 to the push rod 22. Plate 40 has a surface facing the center housing 32 that corresponds to the shape of a dome 42 extending from a central wall 39 of center housing 32 into the service chamber. The central dome 42 defines a generally frustro-conical cross-sectional shape. Both an outer and inner face of the plate 40 are formed with a similar shape. The diaphragm 38 is formed with a central portion 44 that is permanently deformed to include a similar frustro-conical configuration. The service chamber piston 46 has a central portion 48 formed with a similar frustro-conical depression. Although frustro-conical shapes are illustrated, other cross-sections may be used. Preferably the area of the cross-section decreases as one moves from the spring chamber into the service chamber. Push rod 49 is fixed to the piston 48 for movement to actuate a brake as is known.

In operation, the spring 26 may drive the push rod 22 downwardly into the service chamber. Plate 40 contacts the diaphragm 38 and moves the diaphragm 38 along with piston 46 outwardly such that the push rod 48 is driven outwardly of the housing member 36. During this movement, the mating surfaces of the dome 42, the plate 40, the diaphragm portion 44 and the piston portion 48 ensure that the push rods 22 and 49 are not misaligned.

As also shown in FIG. 1, the spring piston 24 is formed with depression 58 such that the diaphragm 28 may be deformed upwardly by air pressure into the depression as shown at 60. Preferably, the diaphragm 28 is not permanently deformed, but rather is a flexible diaphragm which may be deformed upwardly into that portion 60 by air pressure.

Figure 2A:
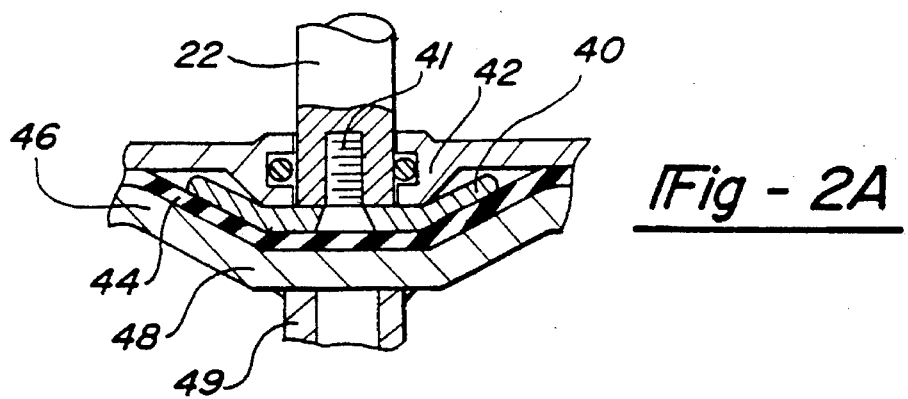
FIG. 2a is a cross-sectional view through a portion of the brake actuator shown in FIG. 1.
Figure 2B:
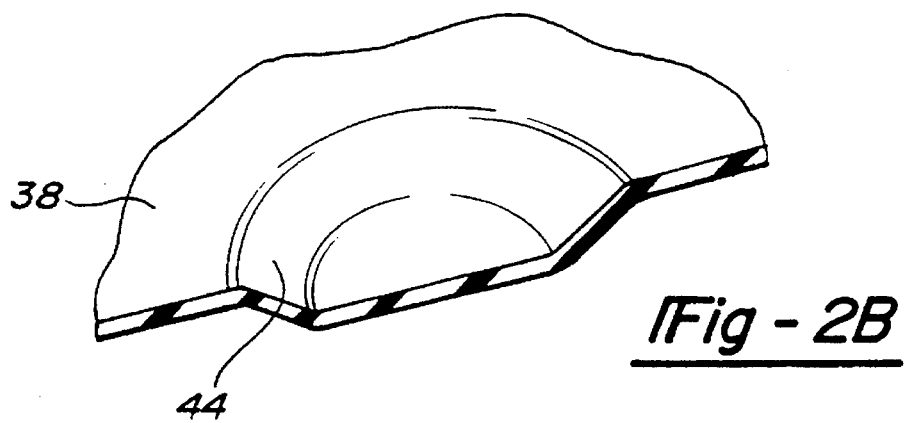
FIG. 2b shows a diaphragm as used in the inventive service chamber.

As shown in FIG. 2a, the portions 42, 43, 44 and 48 ensure proper alignment and positioning of the push rods 22 and the other members. As is shown in FIG. 2b, the deformation on the diaphragm is preferably permanent.

FIGS. 1 and 2a also show the general configuration of the members while the vehicle is being driven. Should a vehicle hit a bump or pothole the "stacked" components are less likely to become misaligned due to the frustro-conical guiding structures. In the prior art there was facial contact which sometimes allowed sliding due to tolerances.

Figure 3:
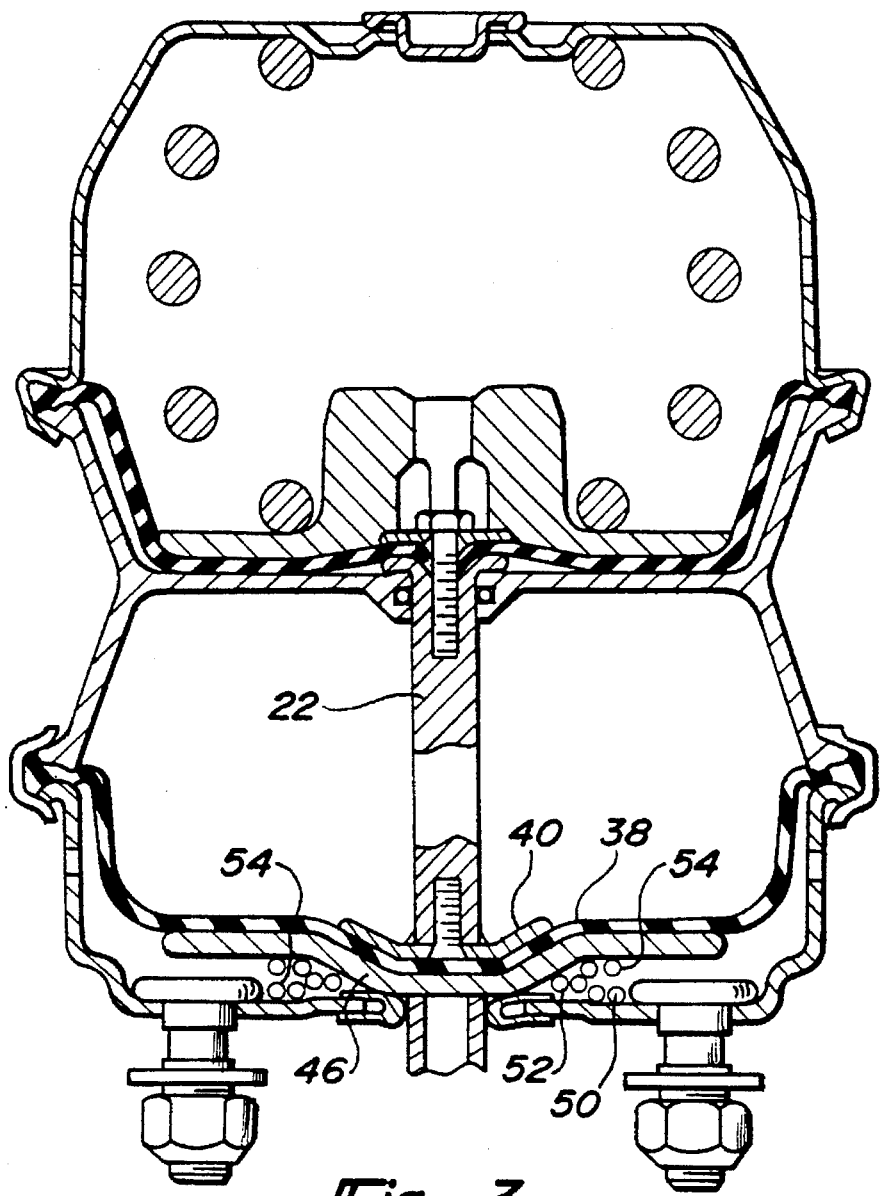
FIG. 3 is a cross-sectional view of the brake actuator shown in FIG. 1, with the power spring actuated.

As shown in FIG. 3, during movement of the spring 26 to actuate push rod 22, the plate 40 moves with the diaphragm 38 and the piston 46. The spring 50 in the service chamber is compressed such that the central portions 52 are received at the radially innermost portions, while the axially outer portions 54 fit around the central portion 52. The type of spring, which is known as a bed spring type spring, facilitates the use of the piston 46 with frustro-conical portion 48. The spring portions 52 fit into the frustro-conical portions as shown, while the axially outer portions 54 are received away from the frustro-conical portions.

Now, as shown in FIG. 3, when the power spring 26 is actuated to force the push rod 22 outwardly of the center housing 32, the diaphragm 28 overlies the central wall 39 of the center housing 32. In this way, additional stroke is achieved for the push rod 22 over the prior art. The prior art included an extension extending into the spring chamber, and that extension prevented the diaphragm from moving to the fully lowered position shown in FIG. 3. With the improved service chamber dome extension, the diaphragm can move to the position shown in FIG. 3 thus providing additional stroke. At the same time, the overall length of the center housing 32 may be reduced. The additional length for the push rod 22, which must otherwise be housed between the housings 30 and 32 is no longer necessary.

A preferred embodiment of this invention has been disclosed, however, a worker of ordinary skill in the art would recognize that certain modifications would come within the scope of this invention. For that reason the following claims should be studied to determine the true scope and content of this invention.

We claim:

1. A combination for use in a service chamber of a spring brake actuator comprising:

a diaphragm having a central permanently deformed portion;

a push rod having a piston, said piston having a permanently deformed portion corresponding to the shape of the permanently deformed portion of said diaphragm; and the cross-sectional shape of said permanently deformed portion of said piston and said diaphragm being generally frusto-conical, to correspond to the shape of a dome extending from a central housing into the service chamber.

2. A spring brake actuator comprising:

a central housing formed to have two attachment surfaces;

an outer housing secured to one of two said attachment surfaces, a power spring received between said outer housing and said central housing, an actuation structure actuated by said power spring and including a diaphragm, and said actuation structure driving a spring chamber push rod through said central housing;

a service chamber housing selectively connected to the other attachment surface on said central housing to define a service chamber, a push rod received within said service chamber and selectively driven outwardly of said service chamber; and said central housing having a dome extension into said service chamber from a central wall of said central housing, said spring chamber push rod extending through said dome extension.

3. A spring brake actuator as recited in claim 2, wherein a service chamber diaphragm is received between said central housing and said service chamber housing.

4. A spring brake actuator as recited in claim 3, wherein said service chamber diaphragm is permanently deformed to correspond generally to the shape of said dome.

5. A spring brake actuator as recited in claim 4, wherein a service chamber piston is received between said service chamber diaphragm and said service chamber push rod, and is fixed for movement with said service chamber push rod, said service chamber piston having a surface which corresponds to the deformed surface portion of said diaphragm.

6. A spring brake actuator as recited in claim 5, wherein said spring chamber push rod extends through said dome extension and is fixed to a plate, said plate having an inner surface facing said extension which is formed of a cross-section that corresponds to the cross-section of said dome, and said plate having an outer surface facing said deformed portion of said diaphragm, said outer surface also being formed of a cross-section that corresponds to the deformed portion of said diaphragm.

7. A spring brake actuator as recited in claim 6, wherein the area of said cross-sections change, and are larger adjacent said center housing then they are spaced into said service chamber such that said dome, said plate, said service chamber diaphragm and said service chamber piston all stack.

8. A spring brake actuator as recited in claim 7, wherein said cross-sections are generally frustro-conical.

9. A spring brake actuator as recited in claim 8, wherein a spring biases said service chamber piston back upwardly toward said center housing, said spring having coil at a central axial portion with a radial dimension that is smaller than the radial dimensions of coils at either axial end of said spring.

10. A spring brake actuator as recited in claim 5, wherein a spring biases said service chamber piston back upwardly toward said center housing, said spring having coils at a central axial portion with a radial dimension that is smaller than the radial dimensions of coils at either axial end of said spring.

11. A spring brake actuator comprising:

a center housing formed to have two attachment surfaces;

an outer housing secured to one of two said attachment surfaces, a power spring received between said outer housing and said central housing, an actuation structure actuated by said power spring, and said actuation structure driving a spring chamber push rod through said center housing;

a service chamber housing selectively connected to the other attachment surface on said center housing to define a service chamber, a push rod received within said service chamber and selectively driven outwardly of said service chamber; and said central housing having a dome extension into said service chamber from a central wall of said center housing, said spring chamber push rod extending through said dome extension, said service chamber including a diaphragm with a central deformed portion corresponding to said dome.

12. A spring brake actuator as recited in claim 11, wherein a service chamber piston is received between said service chamber diaphragm and said service chamber push rod, and is fixed for movement with said service chamber push rod, said service chamber piston having a surface which corresponds to the deformed portion of said diaphragm.

13. A spring brake actuator as recited in claim 12, wherein said spring chamber push rod extends through said dome extension and is fixed to a plate, said plate having an inner surface facing said extension which is formed of a cross-section that corresponds to the cross-section of said extension, and said plate having an outer surface facing said deformed portion of said diaphragm, said outer surface also being formed of a cross-section that corresponds to the deformed portion of said diaphragm.

14. A spring brake actuator as recited in claim 13, wherein the area of said cross-sections change, and are larger adjacent said center housing then they are spaced into said service chamber such that said dome, said plate, said service chamber diaphragm and said service chamber piston all stack.

15. A spring brake actuator as recited in claim 14, wherein said cross-sections are generally frustro-conical.

16. A spring brake actuator as recited in claim 15, wherein a spring biases said service chamber piston back upwardly toward said center housing, said spring having coils at a central axial portion with a radial dimension that is smaller than the radial dimensions of coils at either axial end of said spring.

17. A spring brake actuator as recited in claim 13, wherein a spring biases said service chamber piston back upwardly toward said center housing, said spring having coils at a central axial portion with a radial dimension that is smaller than the radial dimensions of coils at either axial end of said spring.

18. A spring brake actuator as recited in claim 11, wherein said actuation structure includes a diaphragm.

* * * * *